United States Patent
Lu et al.

(10) Patent No.: US 7,868,483 B2
(45) Date of Patent: Jan. 11, 2011

(54) POWER MANAGEMENT SYSTEMS WITH CURRENT SENSORS

(75) Inventors: Chun Lu, San Jose, CA (US); Xinhe Su, Chengdu (CN)

(73) Assignee: O2Micro, Inc., Santa Clara, CA (US)

( * ) Notice: Subject to any disclaimer, the term of this patent is extended or adjusted under 35 U.S.C. 154(b) by 196 days.

(21) Appl. No.: 12/009,466

(22) Filed: Jan. 18, 2008

(65) Prior Publication Data

US 2009/0066161 A1    Mar. 12, 2009

Related U.S. Application Data (60) Provisional application No. 60/967,653, filed on Sep. 6, 2007.

(51) Int. Cl.
*H02J 1/00* (2006.01)

(52) U.S. Cl. .............. 307/85; 307/64; 307/70; 307/80; 307/86

(58) Field of Classification Search ............. 307/43–44, 307/48, 51–52, 62, 64, 66, 70
See application file for complete search history.

(56) References Cited

U.S. PATENT DOCUMENTS

| | | | | |
|---|---|---|---|---|
| 4,366,389 A | * | 12/1982 | Hussey | 307/66 |
| 4,782,241 A | * | 11/1988 | Baker et al. | 307/66 |
| 5,430,365 A | * | 7/1995 | Taylor et al. | 323/273 |
| 5,898,234 A | * | 4/1999 | Kitagawa | 307/48 |
| 5,909,360 A | * | 6/1999 | Lavin et al. | 307/66 |
| 6,031,302 A | * | 2/2000 | Levesque | 307/130 |
| 6,100,664 A | * | 8/2000 | Oglesbee et al. | 320/125 |
| 6,215,633 B1 | * | 4/2001 | Galecki et al. | 361/93.9 |
| 6,326,771 B1 | * | 12/2001 | Popescu-Stanesti | 320/139 |
| 6,784,385 B2 | * | 8/2004 | Hernandez-Perez | 200/50.33 |
| 7,142,950 B2 | * | 11/2006 | Rasmussen et al. | 700/286 |
| 7,418,314 B2 | * | 8/2008 | Rasmussen et al. | 700/286 |
| 7,436,151 B2 | * | 10/2008 | Wang et al. | 320/134 |
| 2005/0074665 A1 | * | 4/2005 | Spaziante et al. | 429/50 |
| 2006/0139003 A1 | * | 6/2006 | Fischer et al. | 320/132 |
| 2006/0263925 A1 | * | 11/2006 | Chandler | 438/61 |
| 2009/0001948 A1 | * | 1/2009 | Martinez et al. | 323/271 |

* cited by examiner

*Primary Examiner*—Jared J Fureman
*Assistant Examiner*—Adi Amrany (57) ABSTRACT

A power management system includes a power management unit (PMU) and a current sensor. The PMU is operable for controlling a first power source and a second power source. The second power source is operable for being charged by the first power source via a charging path. The current sensor has a first terminal coupled to the first power source and the second power source and has a second terminal coupled to the second power source via the charging path. The current sensor is operable for sensing a first current flowing from the first power source through the current sensor and for sensing a second current flowing from the second power source through the current sensor.

23 Claims, 7 Drawing Sheets

POWER MANAGEMENT SYSTEMS WITH CURRENT SENSORS

RELATED APPLICATION

This application claims priority to U.S. Provisional Application No. 60/967,653, titled Power Management System, filed on Sep. 6, 2007, which is hereby incorporated by reference in its entirety.

TECHNICAL FIELD

The present invention relates to electronic systems and more particularly to power management systems.

BACKGROUND

A power management system is usually employed in an electronic system for managing power supply from a power source. When an over-current condition occurs, the electronic system can be deteriorated. Disadvantages and drawbacks exist in conventional power management systems, e.g., in an over-current protection function. In one conventional topology, the presence of one sense resistor for each DC/DC converter can increase component number and cost, and decrease system efficiency. In another conventional topology, an output current can be detected and information of the output current is fed back to the power management system. Thus, over-current protection actions can be triggered according to the feedback information. However, an unstable output current can cause the over-current protection inaccurate and system noises can be increased.

SUMMARY

In one embodiment, a power management system includes a power management unit (PMU) and a current sensor. The PMU is operable for controlling a first power source and a second power source. The second power source is operable for being charged by the first power source via a charging path. The current sensor has a first terminal coupled to the first power source and the second power source and has a second terminal coupled to the second power source via the charging path. The current sensor is operable for sensing a first current flowing from the first power source through the current sensor and for sensing a second current flowing from the second power source through the current sensor.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

A power management system with a current sensor is disclosed herein in the present disclosure. Since the embodiments shown in the drawings are for illustrative purposes, some sub-components and/or peripheral components generally incorporated in the disclosure are omitted herein for purposes of brevity and clarity. In describing embodiments in accordance with the present invention, specific terminologies are employed for sake of clarity. However, the disclosure of this specification is not intended to be limited to selected terminologies and specified embodiments. It is understood that each specific element includes all technical equivalents that operate in a similar manner.

In one embodiment, a power management system with a current sensor is provided. The power management system can include a power management unit (PMU) and a current sensor. The PMU is operable for controlling a first power source and a second power source. The first power source can be used to charge the second power source via a charging path. The current sensor has a first terminal coupled to the first power source and the second power source and has a second terminal coupled to the second power source via the charging path. The current sensor is operable for sensing a first current flowing from the first power source through the current sensor and for sensing a second current flowing from the second power source through the current sensor. The PMU is also operable for triggering a protection action if one of the first current and the second current is greater than a predetermined threshold.

Figure 1:
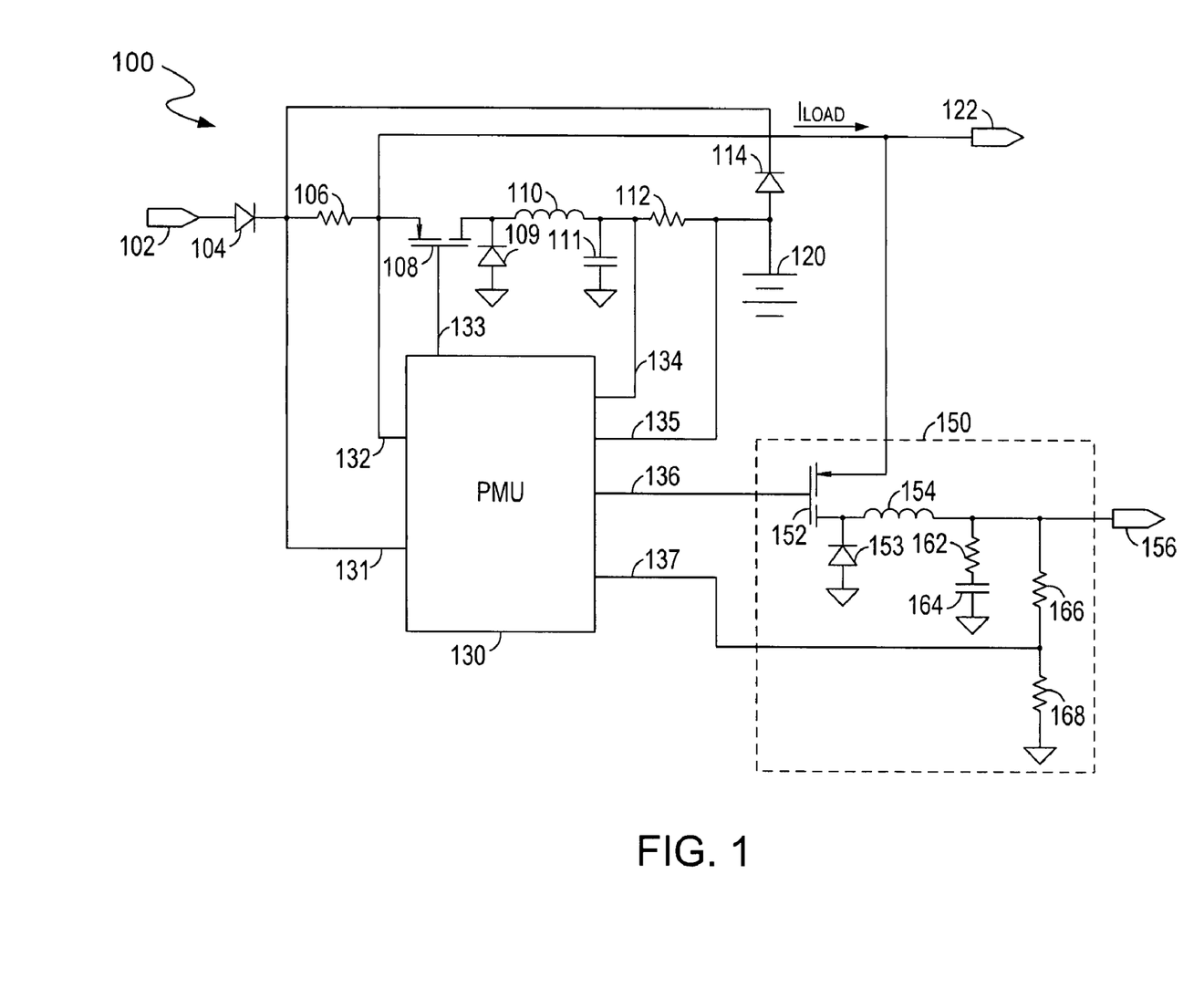
FIG. 1 illustrates a block diagram of a power management system with a current sensor, in accordance with one embodiment of the present invention.

FIG. 1 illustrates a block diagram of a power management system 100 with a current sensor 106, in accordance with one embodiment of the present invention. In one embodiment, the current sensor 106 is utilized to sense a first current flowing from a first power source through the current sensor 106 and a second current flowing from a second power source through the current sensor 106. The first power source and the second power source can supply power to load(s) coupled to the power management system 100. The power management system 100 provides an over-current protection function that can protect the load(s) from being deteriorated when a load current $I_{load}$ is greater than a preset (predetermined) threshold $I_{ocp}$. The first current and the second current sensed by the current sensor 106 can respectively indicate the level of the load current $I_{load}$ from the first power source and the second power source. Therefore, a protection action can be triggered if one of the first current and the second current is greater than a predetermined threshold. In one embodiment, the current sensor 106 can be a resistor.

In one embodiment, the first power source (e.g., an adapter; not shown in FIG. 1 for purposes of brevity and clarity) can be coupled to an input terminal 102. In one embodiment, the power management system 100 includes an output terminal 122, a converter 150 (e.g., a step-down/step-up DC-DC converter) and an output terminal 156 coupled to the converter 150. Load(s) can be coupled to the output terminal 122 and/or the output terminal 156. The first power source is coupled to a first terminal of the resistor 106 and can supply power to the load(s) coupled to the output terminal 122 and/or the converter 150 via a diode 104 and the resistor 106. The converter 150 can generate a regulated DC voltage at the output terminal 156.

The second power source (e.g., a rechargeable battery 120) can be coupled to the first terminal of the resistor 106 via a diode 114 and to a second terminal of the resistor 106 via a charging path including a DC/DC converter shown as a switch 108, a diode 109, an inductor 110, a capacitor 111, and a resistor 112. In one embodiment, the switch 108 is a metal-oxide semiconductor (MOS) transistor. If the rechargeable battery 120 is not full of capacity, the first power source (e.g., the adapter) at the input terminal 102 can charge the rechargeable battery 120 via the diode 104, the resistor 106, the switch 108, the inductor 110 and the resistor 112, in one embodiment. The resistor 112 can be a charging sensor operable for sensing a charging current from the adapter to the rechargeable battery 120. If the adapter is absent, the rechargeable battery 120 can provide power to the load(s) coupled to the output terminal 122 and to the converter 150 via the diode 114 and the resistor 106.

In one embodiment, a power management unit (PMU) 130 is employed to control the first power source and the second power source in the power management system 100. The resistor 106 can sense a current $I_{rsad}$ flowing through the resistor 106. The current $I_{rsad}$ can be the first current from the first power source (e.g., the adapter) or the second current from the second power source (e.g., the rechargeable battery 120). The PMU 130 monitors the current $I_{rsad}$ by monitoring a voltage drop $V_{rsad}$ cross the resistor 106. If the voltage $V_{rsad}$ is greater than a predetermined threshold, the PMU 130 can trigger over-current protection actions to protect the power management system 100 and load(s) coupled to the power management system 100 from deterioration. In one embodiment, the PMU 130 can cut off power supply to the converter 150. Thus, the load coupled to the output terminal 156 can be protected from over-current deterioration.

The converter 150 includes a switch 152, a diode 153, an inductor 154, a resistor 162, a capacitor 164 coupled to the resistor 162, a resistor 166, and a resistor 168, in one embodiment. In one embodiment, the switch 152 can be a P-channel metal-oxide-semiconductor field-effect transistor (MOSFET). The converter 150 can be a DC to DC converter that converts an input DC voltage generated from the first power source (e.g., the adapter) or from the second power source (e.g., the rechargeable battery 112) to a regulated DC voltage at the output terminal 156 according to specific requirements. In other words, the converter 150 can convert an input voltage selectively from the first power source and the second power source to an output voltage. The resistors 166 and 168 can provide the PMU 130 with a feedback voltage 137 that is proportional to the regulated DC voltage. The PMU 130 controls a gate terminal of the switch 152 by a signal 136, thus controlling the power supply to the converter 150. In one embodiment, the signal 136 can be a pulse width modulation (PWM) signal. In the example of FIG. 1, when the signal 136 is at a low level, the switch 152 is turned on, and thus power is supplied to the converter 150. When the signal 136 is at a high level, the switch 152 is turned off, and thus power supply to the converter 150 is cut off. Thus, the PMU 130 can control the level of the regulated DC voltage by adjusting a duty cycle of the signal 136. When an over-current protection action is triggered, the PMU 130 can cut off power supply to the converter 150 by turning off the switch 152, in one embodiment.

In one embodiment, the adapter provides power to the power management system 100 and the load(s), and the rechargeable battery 120 is absent or not charged (e.g., the switch 108 is turned off). A current $I_{rsad}$ flows from the adapter to the output terminal 122 and to the converter 150 via the resistor 106. The current $I_{rsad}$ includes the load current $I_{load}$ from the adapter to the load(s) at the output terminals 122 and/or 156. More specifically, the load current $I_{load}$ is equal to the current $I_{rsad}$. The voltage drop (e.g., $V_{rsad}$) cross the resistor 106 is equal to the resistance of the resistor 106 multiplied by the current $I_{rsad}$, e.g., $V_{rsad}=R_{rsad}*I_{rsad}$. The PMU 130 can obtain $V_{rsad}$ via a signal line 131 and a signal line 132, and thus monitoring the load current $I_{load}$ which is equal to $I_{rsad}$. If the current $I_{rsad}$ is greater than a predetermined threshold, the PMU 130 can trigger an over-current protection action, e.g., turn off the switch 152, in one embodiment. Thus, the load coupled to the converter 150 can be protected from over-current deterioration.

In one embodiment, the adapter charges the rechargeable battery 120 under control of the PMU 130 and also provides power to the load(s) (e.g., load(s) coupled to the output terminals 122 and/or 156). The PMU 130 can control charging of the rechargeable battery 120 by controlling the switch 108 using a control signal 133 (e.g., a pulse width modulation signal). A load current $I_{load}$ flows from the adapter to the load(s) via the diode 104 and the resistor 106. Simultaneously, a charging current $I_{chg}$ flows from the adapter to the rechargeable battery 120 via the diode 104, the resistor 106, the switch 108, the inductor 110 and the resistor 112. Thus, a current $I_{rsad}$ flowing through the resistor 106 includes the charging current $I_{chg}$ and the load current $I_{load}$. More specifically, the current $I_{rsad}$ is equal to the summation of the load current $I_{load}$ and the charging current $I_{chg}$, e.g., $I_{rsad}=I_{load}+I_{chg}$. The PMU 130 can monitor the current $I_{rsad}$ by the voltage drop cross the resistor 106. In addition, the PMU 130 can obtain a voltage cross the resistor 112 via a signal line 134 and a signal line 135, and thus monitoring the charging current $I_{chg}$. Therefore, the PMU 130 can also sense the load current $I_{load}$ by monitoring $I_{rsad}$ and $I_{chg}$. If the load current $I_{load}$ is greater than the preset (predetermined) threshold $I_{ocp}$, the PMU 130 can trigger an over-current protection action, e.g., turn off the switch 152, in one embodiment.

Advantageously, if the charging current $I_{chg}$ is greater than a preset value, the PMU 130 can set the control signal 133 (e.g., to a high level) to turn off the switch 108 to terminate the charging process. The charging current $I_{chg}$ is then flowing from ground to the inductor 110 through a diode 109 and is decreasing gradually after the switch 108 is turned off. The PMU 130 can also monitor a voltage of the rechargeable battery 120 via the signal line 135. If the rechargeable battery 120 is charged to a full capacity, the switch 108 can also be turned off by the control signal 133. Consequently, the adapter stops charging the rechargeable battery 120.

If the adapter is absent, the rechargeable battery 120 provides power to the output terminal 122 and/or the converter 150, in one embodiment. A current $I_{rsad}$ flows from the rechargeable battery 120 to the output terminal 122 and to the converter 150 via the diode 114 and the resistor 106. The current $I_{rsad}$ includes a load current $I_{load}$ from the rechargeable battery 120 to the load(s) at the output terminals 122 and/or 156. More specifically, $I_{rsad}$ is equal to load. Similarly, the PMU 130 can monitor the load current $I_{load}$ by the voltage drop cross the resistor 106. If the current $I_{rsad}$ is greater than the predetermined threshold, which indicates that the current $I_{load}$ is greater than the preset threshold $I_{ocp}$, the PMU 130 can trigger an over-current protection action, e.g., turn off the switch 152, in one embodiment.

Figure 2:
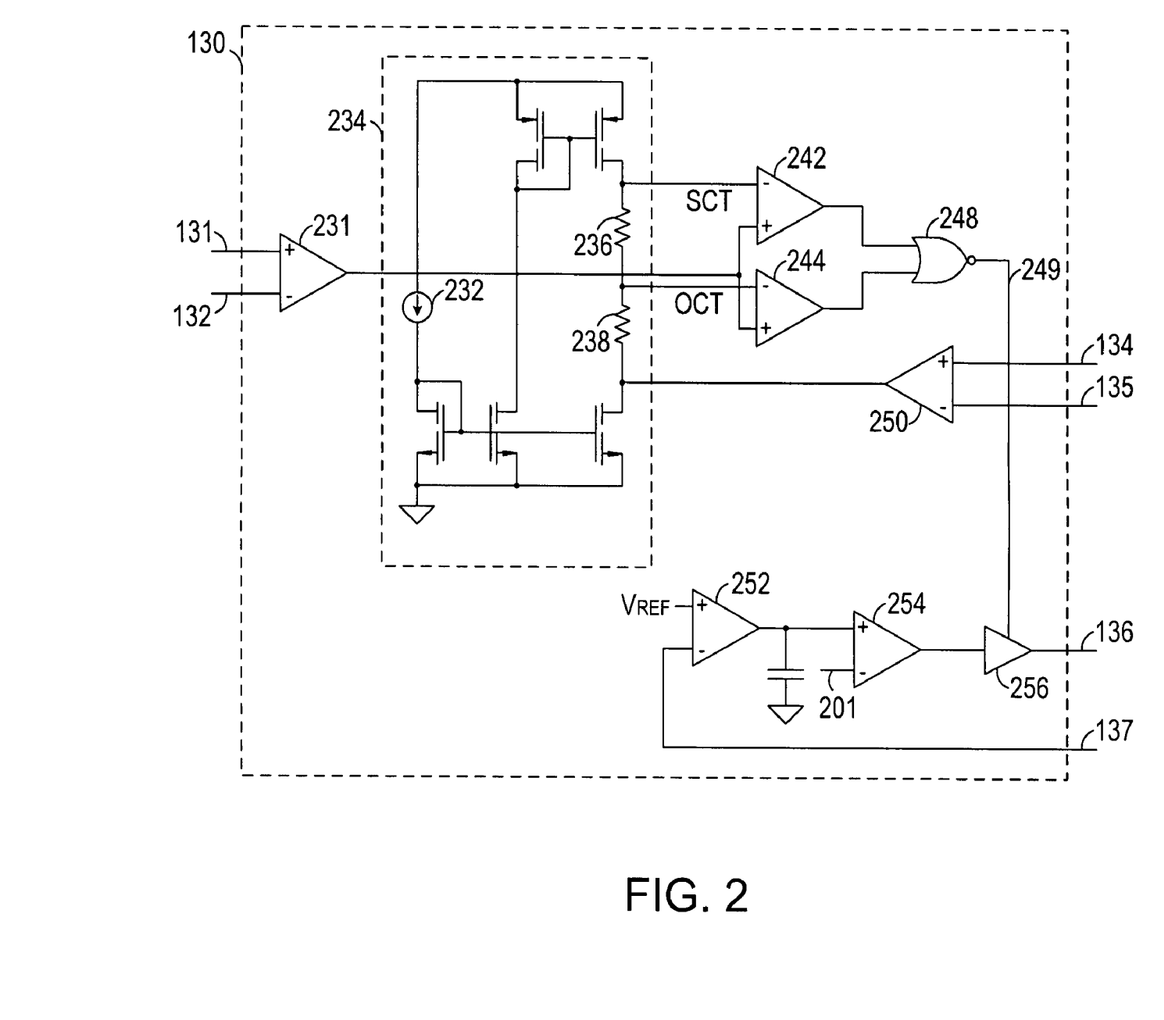
FIG. 2 illustrates a diagram of a power management unit (PMU) in FIG. 1, in accordance with one embodiment of the invention.

FIG. 2 illustrates a diagram of the power management unit (PMU) 130 in FIG. 1, in accordance with one embodiment of the invention. FIG. 2 shows part of the PMU 130 in FIG. 1 and some elements in the PMU 130 are not shown in FIG. 2 for purposes of brevity and clarity. Elements labeled the same as in FIG. 1 have similar functions and hence any repetitive description of these elements is omitted herein for purposes of brevity and clarity. The PMU 130 includes an error amplifier 252, a comparator 254 and a driver 256 coupled in series for generating the signal 136, in one embodiment. The error amplifier 252 generates an error signal based upon a difference between the feedback voltage 137 from the converter 150 and a reference voltage $V_{ref}$. The error signal from the error amplifier 252 is further compared with a triangular signal 201 by the comparator 254. The comparator 254 generates a pulse width modulation (PWM) signal to the driver 256 based on the comparison result. The driver 256 generates the signal 136 according to the PWM signal from the comparator 254. The signal 136 controls the states of the switch 152 of the converter 150. Therefore, the output voltage of the converter 150 can be controlled by the PMU 130 according to the reference voltage $V_{ref}$.

The PMU 130 further includes an amplifier 231 for amplifying the voltage $V_{rsad}$ cross the resistor 106, where $V_{rsad}=R_{sad}*I_{rsad}$. The amplifier 231 generates a voltage $V_{rsad-apf}$ indicative of a level of the current $I_{rsad}$. The PMU 130 includes a current mirror 234, in one embodiment. A current source 232 provides a current to the current mirror 234. In one embodiment, a current through the resistor 236 and the resistor 238 is equal to the current from the current source 232. In one embodiment, the current mirror 234 provides a short-circuit threshold voltage (SCT) to a comparator 242 and an over-current threshold voltage (OCT) to a comparator 244. The level of SCT is higher than that of OCT due to the series connection of the resistor 236 and the resistor 238, in one embodiment.

If the charging current $I_{chg}$ is zero, OCT is equal to a voltage drop cross the resistor 238 and SCT is equal to a summation of OCT and a voltage drop cross the resistor 236. If the adapter charges the rechargeable battery 120, an amplifier 250 in the PMU 130 can generate an amplified voltage signal $V_{chg-apf}$ according to the charging current $I_{chg}$. In this situation, OCT is equal to $V_{chg-apf}$ plus the voltage drop cross the resistor 238. SCT is equal to a summation of OCT and the voltage drop cross the resistor 236.

The voltage $V_{rsad-apf}$ from the amplifier 231 is compared with SCT and OCT by the comparator 242 and the comparator 244 respectively. In one embodiment, if the voltage $V_{rsad-apf}$ is less than OCT, the load current $I_{load}$ is in a normal range. Thus, both comparators 242 and 244 generate low voltage signals. If the voltage $V_{rsad-apf}$ is higher than OCT and lower than SCT (OCT<$V_{rsad-apf}$<SCT), it can indicate an over-current condition of the load current $I_{load}$. Thus, the comparator 244 generates a high voltage signal. In one embodiment, an over-voltage protection action will be enabled if the condition of OCT<$V_{rsad-apf}$<SCT maintains for a preset time period (e.g., a time delay). If the voltage $V_{rsad-apf}$ is higher than SCT, which can indicate a short-circuit condition, both comparators 242 and 244 generate high voltage signals.

The outputs of the comparators 242 and 244 are provided to a logic gate 248 (e.g., a NOR gate) to generate a signal 249. In one embodiment, the signal 249 is set to high if both of the comparators 242 and 244 output low voltage signals, which indicates a normal current situation. The signal 249 is set to low if at least one of the comparators 242 and 244 outputs a high voltage signal, which indicates an over-current condition (e.g., the current $I_{rsad}$ is greater than a predetermined threshold). The signal 249 can control the driver 256. In one embodiment, the driver 256 is shut off when the signal 249 is set to a low voltage level, which indicates an over-current condition. Thus, the signal 136 is set to a high voltage level to turn off the switch 152. Consequently, the converter 150 is shut off and the load coupled to the converter 150 can be protected from over-current deterioration.

Figure 3:
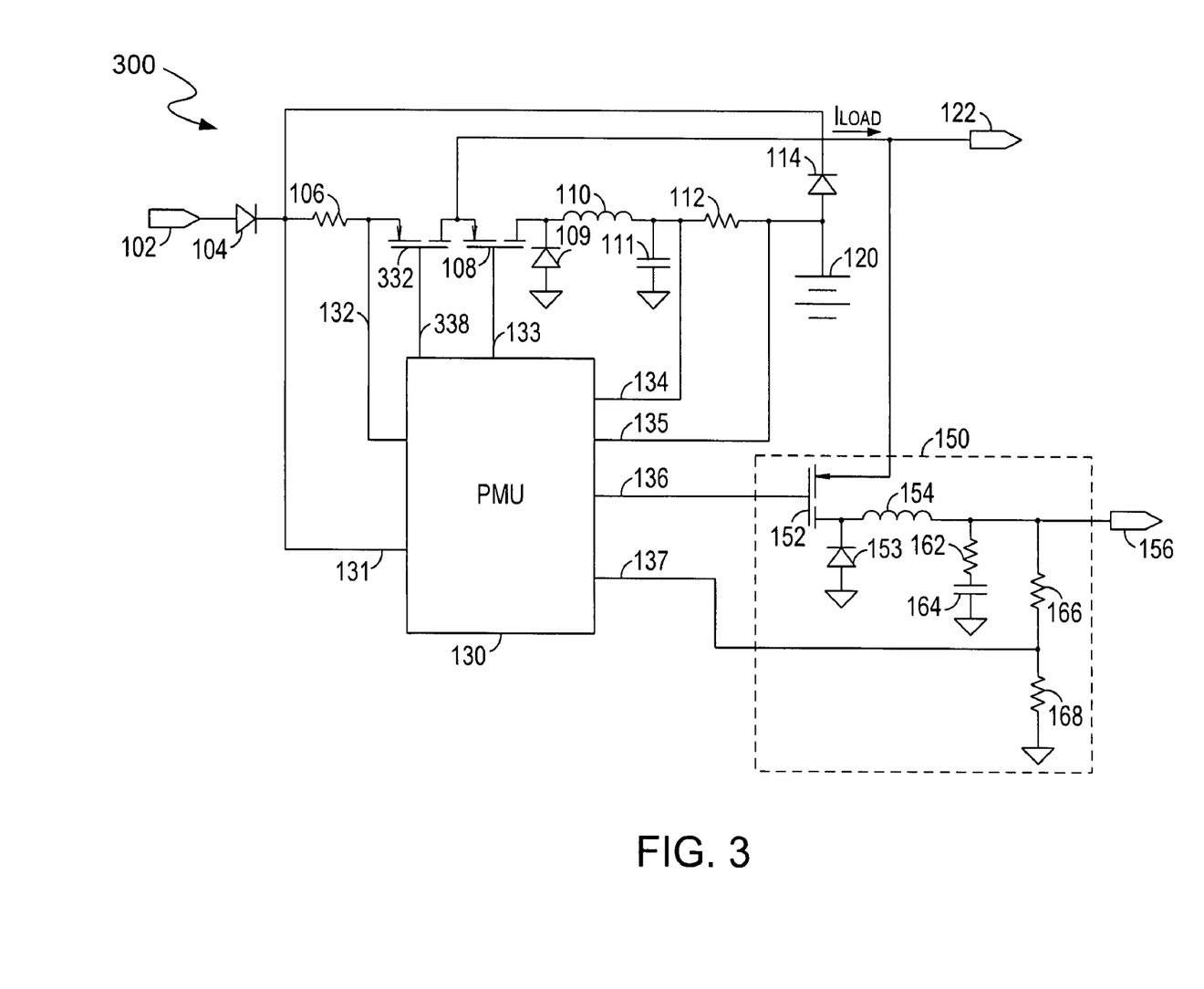
FIG. 3 illustrates a block diagram of a power management system with a current sensor, in accordance with one embodiment of the present invention.

FIG. 3 illustrates a block diagram of a power management system 300 with a current sensor 106, in accordance with one embodiment of the present invention. Elements that are labeled the same as in FIG. 1 and FIG. 2 have similar functions and hence any repetitive description of these elements is omitted herein for purposes of clarity and brevity. In one embodiment, a switch 332 (e.g., an N-channel MOSFET) is coupled to the resistor 106 and is operable for being turned off if the current $I_{rsad}$ flowing from the adapter or from the rechargeable battery 120 is greater than a predetermined threshold. The PMU 130 can generate a control signal 338 to control the state of the switch 332. The switch 332 can be turned off if an over-current protection action is triggered. As such, the power supply in the power management system 300 can be cut off by turning off switch 332. Advantageously, the load(s) coupled to the output terminal 122 and/or the output terminal 156 can be protected from over-current deterioration. The power management system 300 can restart after powered off, in one embodiment.

The power management system 100/300 can include multiple converters (e.g., converter 150) coupled to the resistor 106 and operable for converting an input voltage generated from the adapter coupled to input terminal 102 or from the rechargeable battery 120 to multiple regulated output voltages, in one embodiment. The converters can be DC-DC converters and be parallel connected. The PMU 130 can monitor a total current flowing through the resistor 106 including the charging current $I_{chg}$ and the load current $I_{load}$ (e.g., the current flowing to the output terminal 122 and currents flowing to the multiple converters). Each of the converters can include a switch (e.g., the switch 152) operable for being turned off if the current $I_{rsad}$ is greater than a predetermined threshold. In one embodiment in FIG. 1, if the current $I_{rsad}$ is greater than the predetermined threshold, the PMU 130 will turn off the switches in the converters to protect the converters and loads coupled to the converters. In one embodiment in FIG. 3, the power management system 300 can be shut down by turning off the switch 332 if the current $I_{rsad}$ is greater than the predetermined threshold. The predetermined threshold can vary according to different applications.

Figure 4:
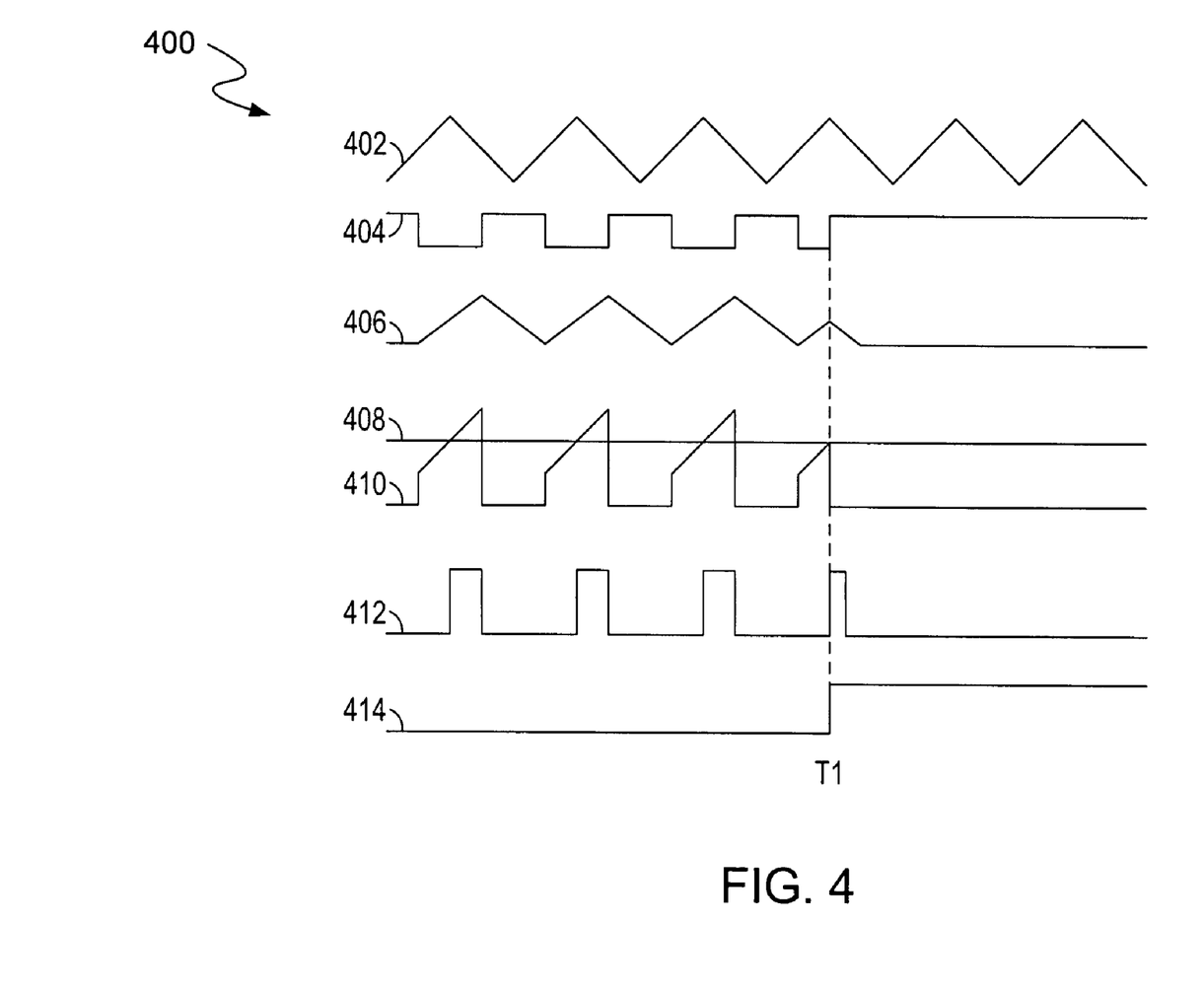
FIG. 4 illustrates a timing diagram of signals during operation of a power management system, in accordance with one embodiment of the invention.

FIG. 4 illustrates a timing diagram 400 of signals during operation of a power management system, in accordance with one embodiment of the invention. FIG. 4 is described in combination with FIG. 1, FIG. 2 and FIG. 3 for purposes of clarity. Waveform 402 represents the triangular signal 201 provided to the comparator 254. Waveform 404 represents the signal 136 for controlling the state of the switch 152. In one embodiment, when signal 136 is set to high, the switch 152 is turned off. When signal 136 is set to low, the switch 152 is turned on. Waveform 406 represents a level of a current flowing through the inductor 154, which is equal to the current flowing into the converter 150, in one embodiment. Waveform 408 represents a level of the preset over-current threshold (OCT). Waveform 410 represents a level of the current $I_{rsad}$ flowing through the resistor 106. Waveform 412 indicates whether an over-current condition occurs. Waveform 414 indicates whether an over-current protection action is triggered, e.g., the power management system 100 is shut down due to an over-current condition.

If the current $I_{rsad}$ (waveform 410) reaches the level of the OCT (waveform 408), the waveform 412 is set to logic 1 which can indicate an over-current condition. In one embodiment, the number of positive pulses of the waveform 412 can be counted for determining whether to trigger the over-current protection action. If the number of the positive pulses of the waveform 412 in a predetermined time period (a time delay) reaches a preset value, the over-current protection action will be triggered, in one embodiment. In one embodiment, the number of rising edges of the waveform 412 is counted. In the example of FIG. 4, the over-current protection action is triggered at time T1 when the number of the rising edges reaches the preset value. The power to the loads is then cut off. Consequently, the current $I_{rsad}$ (waveform 410) decreases to zero at T1. Because the current $I_{rsad}$ (waveform 410) is lower than the OCT (waveform 408) after T1, the waveform 412 turns to zero after a short time delay since T1. Additionally, the signal 136 (waveform 404) is set to high. The current flowing to the converter 150 (waveform 406) decreases to zero gradually.

Figure 5:
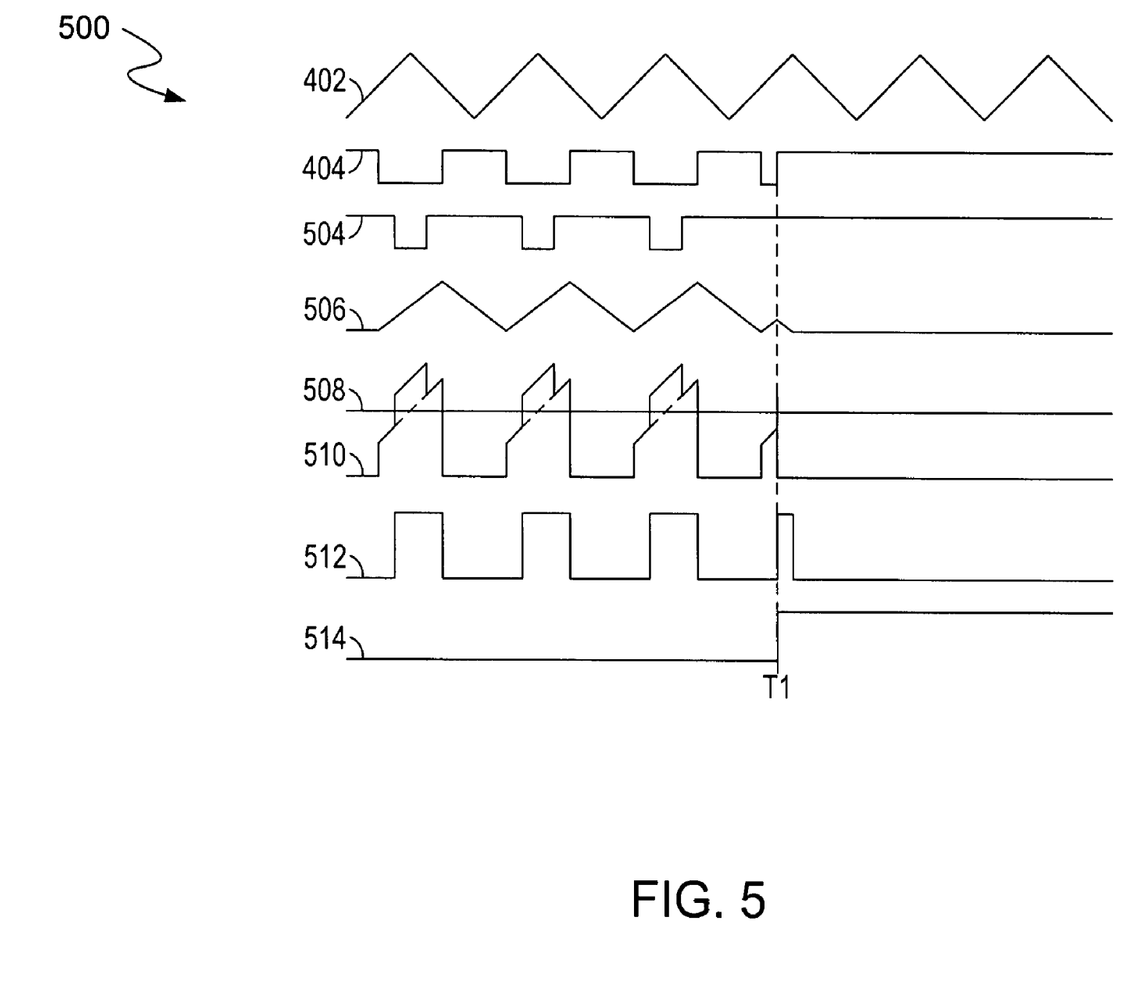
FIG. 5 illustrates a timing diagram of signals during operation of a power management system, in accordance with one embodiment of the invention.

FIG. 5 illustrates a timing diagram 500 of signals during operation of a power management system, in accordance with one embodiment of the invention. The same waveforms/signals in FIG. 4 and FIG. 5 will not be described repeatedly for purposes of brevity, e.g., the waveform 402, the waveform 404, etc. FIG. 5 is described in combination with the power management system 100/300 for purposes of clarity. In one embodiment, two converters (converter 1 and converter 2) are included in the power management system 100. For example, besides the converter 150, another converter is coupled to the terminal 122 for converting an input voltage to a regulated output voltage. The waveform 404 represents the signal controlling converter 1 and the waveform 504 represents the signal controlling converter 2. Waveform 506 represents a level of a current flowing into the two converters (converter 1 and converter 2). Waveform 508 represents a level of the preset over-current threshold (OCT). Waveform 510 represents a level of the current $I_{rsad}$ flowing through the resistor 106. Waveform 512 indicates whether an over-current condition occurs when both converter 1 and converter 2 are in operation. Waveform 514 indicates whether an over-current protection action is triggered.

When both converter 1 and converter 2 are in operation, the current $I_{rsad}$ includes a current flowing through converter 1 and a current flowing through converter 2. In the example of FIG. 5, the over-current protection action is triggered at time T1 when the number of positive pulses of the waveform 512 in a predetermined time period reaches a preset value. In one embodiment, the number of rising edges of the waveform 512 is counted. Thus, both of converter 1 and converter 2 are shut down at time T1 when the number of the rising edges reaches the preset value. Consequently, the waveforms 404, 504 and 514 are set to high after T1. The current $I_{rsad}$ (waveform 510) decreases to zero at T1. Because the level of the current $I_{rsad}$ (waveform 510) is lower than the OCT (waveform 508) after T1, the waveform 512 turns to zero after a short time delay since T1. The waveform 506 decreases to zero gradually.

Figure 6:
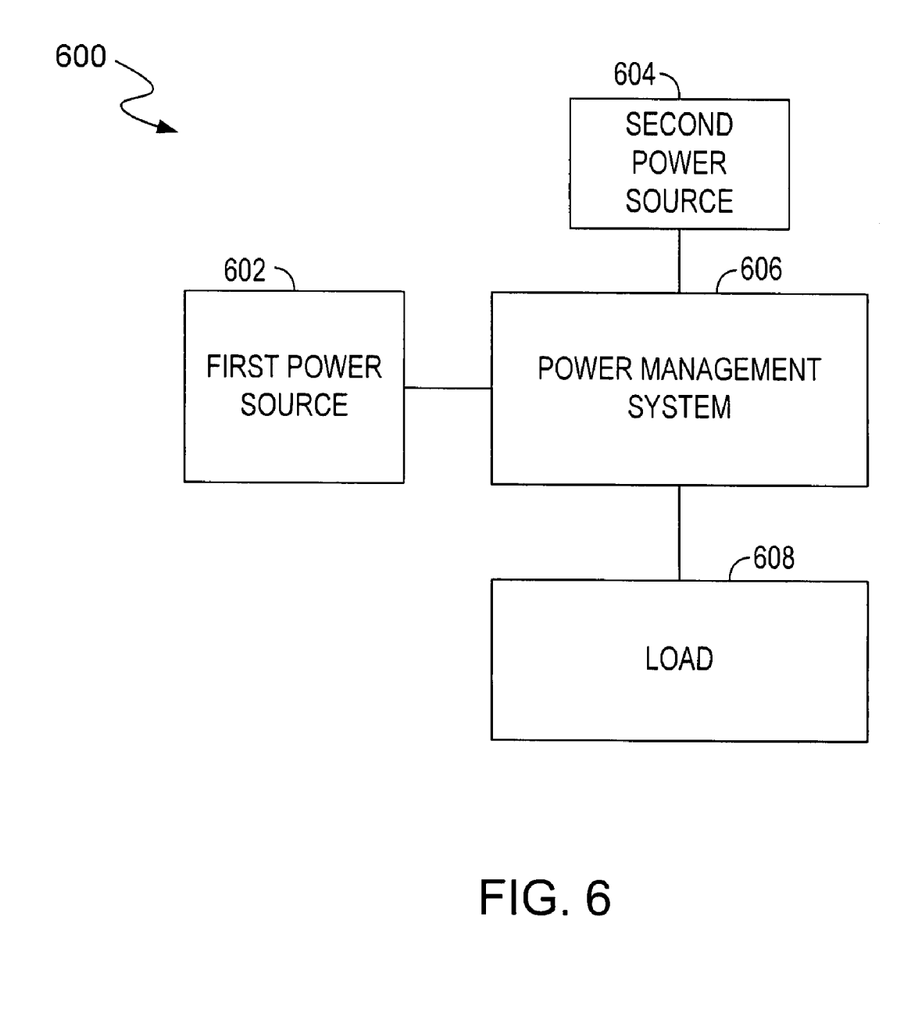
FIG. 6 illustrates a block diagram of an electronic system, in accordance with one embodiment of the present invention.

FIG. 6 illustrates a block diagram of an electronic system 600, in accordance with one embodiment of the invention. The electronic system 600 can be a mobile phone, a computer, etc. The electronic system 600 includes a first power source 602 (e.g., an adapter), a second power source 604 (e.g., a rechargeable battery), and a load 608 coupled to a power management system 606. The power management system 606 can be the power management system 100/300 described hereinabove, in one embodiment. The power management system 606 is operable for managing power supplies in the electronic system 600, e.g., managing power to the load and/or power for charging the rechargeable battery 120. Advantageously, the power management system 606 can trigger an over-current protection action if an over-current condition occurs.

Figure 7:
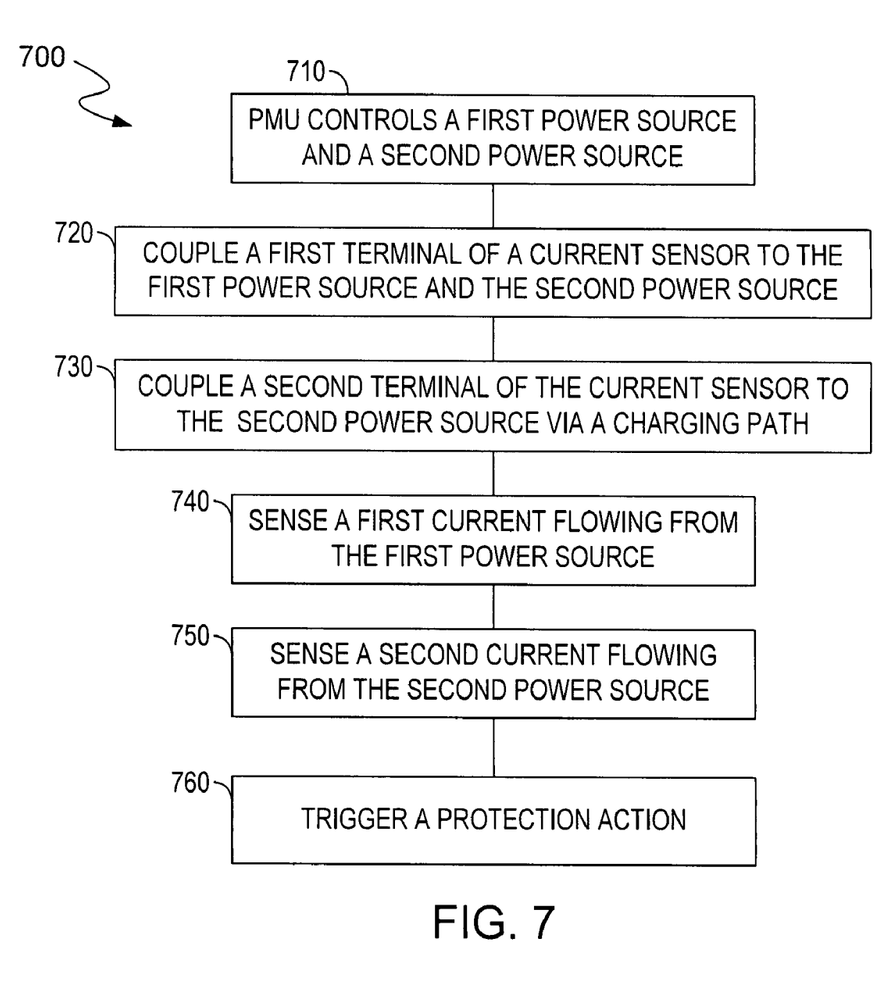
FIG. 7 illustrates a flowchart of operations performed by a power management system, in accordance with one embodiment of the present invention.

FIG. 7 illustrates a flowchart 700 of operations performed by a power management system, in accordance with one embodiment of the present invention. The power management system can employ the configuration as shown in FIG. 1/FIG. 3, in one embodiment. FIG. 7 is described in combination with FIG. 1, FIG. 2 and FIG. 3.

In block 710, the power management unit 130 can control the first power source (e.g., an adapter) and the second power source 120 (e.g., a rechargeable battery). In block 720, a first terminal of a current sensor 106 is coupled to the first power source and the second power source 120. In block 730, a second terminal of the current sensor 106 is coupled to the second power source 120 via a charging path. The first power source can charge the second power source 120 via the charging path, in one embodiment. In block 740, the current sensor 106 (e.g., a resistor) can sense a first current (e.g., $I_{rsad}$) flowing from the first power source through the current sensor 106. In one embodiment, the first current includes a load current (e.g., $I_{load}$) from the first power source to the load when the first power source is present. In another embodiment, the first current includes a charging current (e.g., $I_{chg}$) flowing through the charging path from the first power source to the second power source 120 and a load current (e.g., $I_{load}$) flowing from the first power source to the load. In block 750, the current sensor 106 can sense a second current (e.g., $I_{rsad}$) flowing from the second power source 120 through the current sensor 106. In one embodiment, the second current includes a load current (e.g., $I_{load}$) from the second power source 120 to the load. In block 760, a protection action can be triggered if one of the first current and the second current is greater than a predetermined threshold.

Accordingly, a power management system with a current sensor is provided in the disclosure. The current sensor can sense a current flowing through the current sensor from a first power source and a second power source. In one embodiment, the current flowing through the current sensor can be a load current flowing from the first power source to a load, a load current flowing from the second power source to the load, or a summation of a charging current flowing from the first power source to the second power source and a load current flowing from the first power source to the load.

A power management unit (PMU) can detect an undesirable condition (e.g., an over-current condition) by monitoring the current flowing through the current sensor. If the undesirable condition occurs, the PMU can trigger a protection action to cut off power supply in the power management system and hence the load(s) coupled to an output terminal and/or at least one converter can be protected from deterioration.

Advantageously, a single current sensor is used to sense a first current flowing from a first power source and a second current flowing from a second power source, in one embodiment. Thus, component number can be reduced and cost of the power management system can be decreased. As a result, system efficiency can be improved.

The embodiments that have been described herein, however, are some of the several that utilize this invention and are set forth here by way of illustration but not of limitation. It is obvious that many other embodiments, which will be readily apparent to those skilled in the art, may be made without departing materially from the spirit and scope of the invention as defined in the appended claims. Furthermore, although elements of the invention may be described or claimed in the singular, the plural is contemplated unless limitation to the singular is explicitly stated.

What is claimed is:

1. A power management system comprising:
    a power management unit for controlling a first power source and a second power source, wherein said second power source is charged by said first power source through a charging path, and wherein said first power source and said second power source selectively provide power to a load; and
    a current sensor having a first terminal for being electrically coupled to said first power source and also electrically coupled to said second power source and having a second terminal for being coupled to said second power source via said charging path, wherein said current sensor senses a first current flowing from said first power source through said current sensor and a second current flowing from said second power source through said current sensor, and wherein said power management unit determines whether a short-circuit condition or an over-voltage condition occurs based upon the sensed information from said current sensor.

2. The power management system of claim 1, wherein said power management unit is operable for triggering a protection action if one of said first current and said second current is greater than a predetermined threshold.

3. The power management system of claim 1, further comprising:
    a switch coupled to said current sensor in series and for being turned off if one of said first current and said second current is greater than a predetermined threshold.

4. The power management system of claim 1, further comprising
    a DC-DC converter coupled to said current sensor and coupled between a first output terminal and a second output terminal, wherein said DC-DC converter converts a first output voltage at said first output terminal to a second output voltage at said second output terminal.

5. The power management system of claim 4, wherein said DC-DC converter comprises a switch for being turned off if one of said first current and said second current is greater than a predetermined threshold.

6. The power management system of claim 1, wherein said first current comprises a load current from said first power source to said load coupled to said second terminal.

7. The power management system of claim 1, wherein said first current comprises a charging current flowing through said charging path from said first power source to said second power source and a load current from said first power source to said load coupled to said second terminal.

8. The power management system of claim 7, wherein said charging path comprises a switch, an inductor and a charging sensor coupled in series, wherein said charging sensor senses said charging current, and wherein said switch is turned off if said charging current is greater than a preset threshold.

9. The power management system of claim 1, wherein said second current comprises a load current from said second power source to said load coupled to said second terminal.

10. The power management system of claim 1, wherein said power management unit comprises:
    an amplifier coupled across said current sensor and for generating a voltage signal indicating a level of said first current or said second current;
    a first comparator coupled to said amplifier and for comparing said voltage signal with a short-circuit threshold voltage to determine whether said short-circuit condition occurs; and
    a second comparator coupled to said amplifier and for comparing said voltage signal with an over-voltage threshold voltage to determine whether said over-voltage condition occurs.

11. An electronic system comprising:
    a load;
    a power management system for managing power to said load, said power management system comprising:
        a power management unit for controlling a first power source and a second power source, wherein said second power source is charged by said first power source through a charging path, and wherein said first power source and said second power source selectively provide said power to said load;
    a current sensor having a first terminal electrically coupled to said first power source and also electrically coupled to said second power source and having a second terminal coupled to said second power source via said charging path, wherein said current sensor senses a first current flowing from said first power source through said current sensor and a second current flowing from said second power source through said current sensor, and wherein said power management unit determines whether a short-circuit condition or an over-voltage condition occurs based upon sensed information from said current sensor.

12. The electronic system of claim 11, wherein said power management unit is operable for triggering a protection action if one of said first current and said second current is greater than a predetermined threshold.

13. The electronic system of claim 11, wherein said power management system further comprises:
    a switch coupled to said current sensor in series and for being turned off if one of said first current and said second current is greater than a predetermined threshold.

14. The electronic system of claim 11, wherein said power management system further comprises:
    a DC-DC converter coupled to said current sensor and coupled between a first output terminal and a second output terminal, wherein said DC-DC converter converts a first output voltage at said first output terminal to a second output voltage at said second output terminal.

15. The electronic system of claim 14, wherein said DC-DC converter comprises a switch for being turned off if one of said first current and said second current is greater than a predetermined threshold.

16. The electronic system of claim 14, wherein said power management unit comprises:
    an amplifier coupled across said current sensor and for generating a voltage signal indicating a level of said first current or said second current;
    a first comparator coupled to said amplifier and for comparing said voltage signal with a short-circuit threshold voltage to determine whether said short-circuit condition occurs; and
    a second comparator coupled to said amplifier and for comparing said voltage signal with an over-voltage threshold voltage to determine whether said over-voltage condition occurs.

17. The electronic system of claim 11, wherein said charging path comprises a switch, an inductor and a charging sensor coupled in series, wherein said charging sensor senses said charging current, and wherein said switch is turned off if said charging current is greater than a preset threshold.

18. A method for managing power from a first power source and a second power source, comprising:
- charging said second power source by said first power source via a charging path;
- sensing a first current flowing from said first power source through a current sensor by said current sensor;
- sensing a second current flowing from said second power source through said current sensor by said current sensor; and
- determining whether a short-circuit condition or an over-current condition occurs based upon sensed information from said current sensor,
- wherein said current sensor has a first terminal electrically coupled to said first power source and electrically coupled to said second power source and has a second terminal coupled to said second power source via said charging path.

19. The method of claim 18, further comprising:
- triggering a protection action if one of said first current and said second current is greater than a predetermined threshold.

20. The method of claim 18, wherein said first current comprises a load current from said first power source to a load.

21. The method of claim 18, wherein said first current comprises a charging current flowing through said charging path from said first power source to said second power source and a load current from said first power source to a load.

22. The method of claim 18, wherein said second current comprises a load current from said second power source to a load.

23. The method of claim 18, further comprising:
- generating a voltage signal indicative of a level of said first current or said second current;
- comparing said voltage signal with a short-circuit threshold voltage;
- determining whether said short-circuit condition occurs based upon a first comparison result;
- comparing said voltage signal with an over-voltage threshold voltage; and
- determining whether said over-voltage condition occurs based upon a second comparison result.

* * * * *